United States Patent
Carroll et al.

(10) Patent No.: US 6,708,117 B2
(45) Date of Patent: Mar. 16, 2004

(54) PREPARING AND DISSEMINATING DIGITIZED GEOSPATIAL DATA FOR AREAS HAVING IRREGULAR BOUNDARIES

(76) Inventors: Ernest A. Carroll, 12913 Alton Sq., No. 114, Herndon, VA (US) 20170; Christopher M. Gardner, 3498 Christy La., Woodbridge, VA (US) 22193

( * ) Notice: Subject to any disclaimer, the term of this patent is extended or adjusted under 35 U.S.C. 154(b) by 0 days.

(21) Appl. No.: 10/193,913

(22) Filed: Jul. 15, 2002

(65) Prior Publication Data

US 2003/0135329 A1 Jul. 17, 2003

Related U.S. Application Data

(63) Continuation-in-part of application No. 09/662,903, filed on Sep. 15, 2000, now Pat. No. 6,421,610.

(51) Int. Cl.[7] ............................ G06K 9/36; G06K 19/00
(52) U.S. Cl. ..................................................... 702/5
(58) Field of Search .............................. 702/2, 5

(56) References Cited

U.S. PATENT DOCUMENTS

| | | | |
|---|---|---|---|
| 5,631,970 A | * | 5/1997 | Hsu ............................ 382/113 |
| 6,085,152 A | | 7/2000 | Doerfel |
| 6,281,874 B1 | * | 8/2001 | Sivan et al. ................. 345/660 |
| 6,321,231 B1 | * | 11/2001 | Jebens et al. ............. 707/104.1 |
| 6,343,290 B1 | * | 1/2002 | Cossins et al. ............... 707/10 |
| 2001/0023438 A1 | * | 9/2001 | Ishida ......................... 709/224 |
| 2002/0038323 A1 | * | 3/2002 | Hara et al. ................... 707/528 |

* cited by examiner

Primary Examiner—Donald E. McElheny, Jr.

(57) ABSTRACT

A method of making geospatial imagery data available to the public over a wide ranging communications network such as the internet. Geospatial images are acquired, such as by aerial photography, and are digitized. Plural images are captured, each image covering a portion of the earth surface area of interest. Each image captures at least one characteristic of the portion of the area, such as by taking images in different frequency bands. Data from all images thus obtained is loaded into a common database, loaded into a computer, and integrated to create a single resultant collectively create geospatial image stored in the computer. The integration process is performed so that a nearly seamless mosaiced image covering the entire area of interest is generated. The mosaiced image is stored in mosaic sector form.

8 Claims, 1 Drawing Sheet

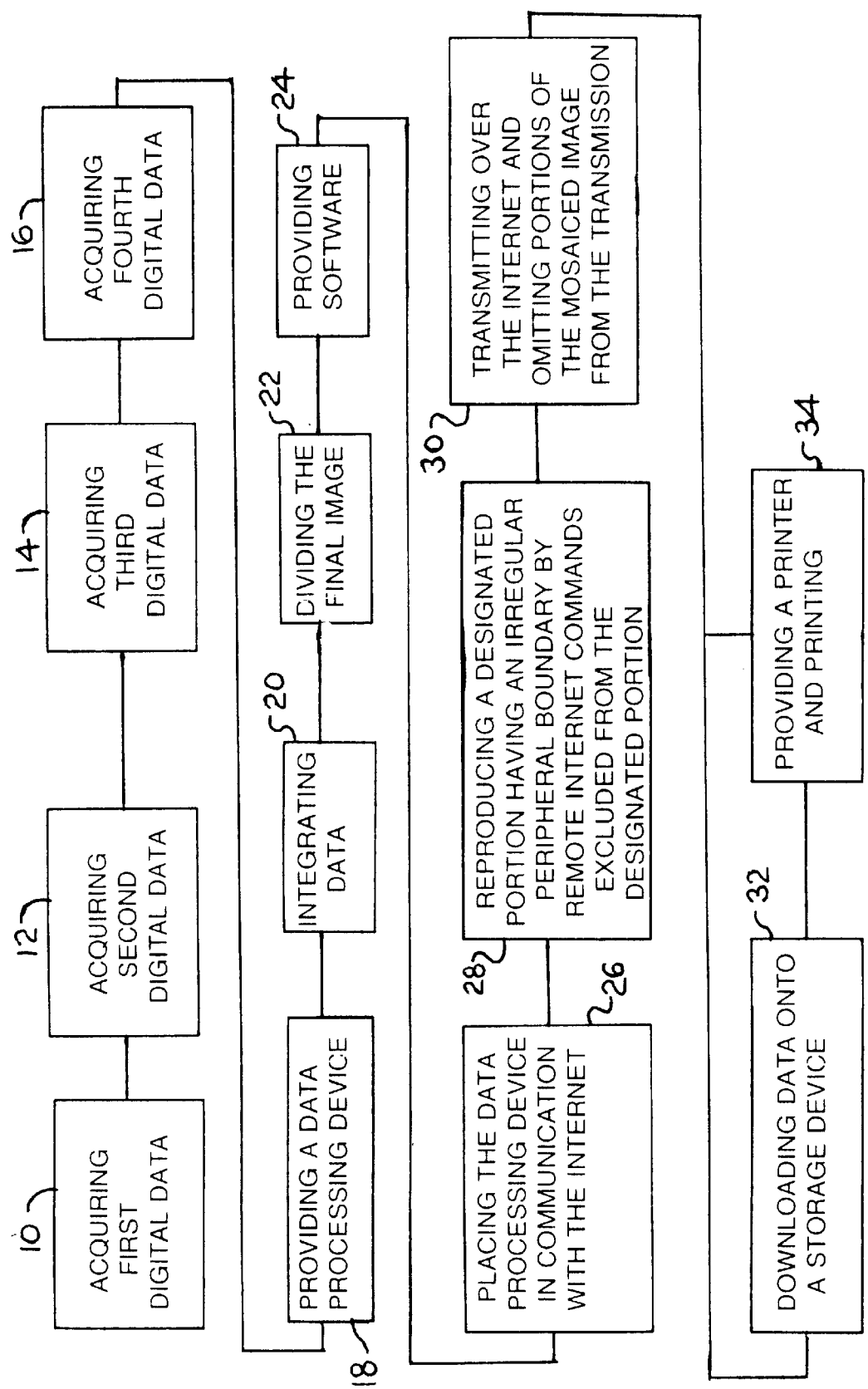

PREPARING AND DISSEMINATING DIGITIZED GEOSPATIAL DATA FOR AREAS HAVING IRREGULAR BOUNDARIES

REFERENCE TO RELATED APPLICATION

This application is a Continuation-In-Part of Ser. No. 09/662,903, filed Sep. 15, 2000, now U.S. Pat. No. 6,421,610.

BACKGROUND OF THE INVENTION

1. Field of the Invention

The present invention relates to a method of acquiring geospatial data, rendering the data in a useful format, and disseminating selected data to users among the public via the internet or other wide ranging communications networks.

2. Description of the Prior Art

Those engaged in planning, forming policies, and undertaking diverse projects involving land use frequently resort to utilizing representations of large areas of land, such as maps showing selected relevant features of the land. The types of information conveyed by maps include boundaries, geographic features such as bodies of waters and mountains, and artificial features such as highways, bridges, and buildings. Aerial imagery has been exploited as a source of information which may be incorporated into maps. For example, satellite and aircraft reconnaissance has provided many photographic images providing detail not readily acquired in other ways.

Ready storage, transmission, reproduction, and dissemination of information has resulted from emerging electronic technologies such as electronic data processing and telecommunications advances. The latter includes cellular communications enabling the internet to become a widely used communications medium. Advent of the internet makes it practical for widely dispersed people to gain access to information from remote sources quickly and easily.

U.S. Pat. No. 6,085,152, issued to Steve Doerfel on Jul. 4, 2000, illustrates one application of data acquired from imagery being made accessible to remote locations via the internet. In this example, a platform mounted camera, which may be digital, acquires images which are transmitted to remote computer monitors or equivalent digital telecommunications devices via the internet. An illustrative application of this process is to monitor local conditions at an airport.

While unmodified images may suit some purposes, such as assessing visibility in the vicinity of an airport, they fail to address needs in other situations. For example, in the field of precision farming, it may be necessary to consider several images to obtain useful information. Plural images may possibly show many different characteristics which may possibly not be obtained from a single image or image making process. Health of a crop, for example, as reflected by sparseness or thickness of foliage may be quantified to determine where certain nutrients or water are deficient or overabundant.

In some image acquisition processes, images are arranged or taken by layers of information. Such images have equivalent geographic coverage, but capture different characteristics. For example, multispectral imagery includes layers of data taken at different frequency bands. Each image data layer conveys different information to the observer. In the example of precision farming, crop health, where this is reflected by vigor of folial growth, may possibly be determined by establishing a near infrared vegetative index or a soil adjusted vegetative index. To make this determination, the farmer must have access to both an infrared scan of the field and a near infrared scan of the same field. In this example, the ratio of light reflected in the infrared band is compared to that reflected in the near infrared band. It may be inferred from this data that the higher the ratio, the more vigorous the growth. Once a farmer has information regarding localized conditions, he or she can adjust seed types, fertilization rates, watering, and other considerations accordingly.

In addition to assuring that an image convey desired information, there remain a number of problems in creating a single image which addresses the particular needs of users of geospatial imagery. One problem area is that of limiting an image of the area of interest to the geographic bounds of that area of interests. An image including desired data such as that corresponding to a particular parcel of land, may be flagged by manipulation of a cursor and reproduced by electronic commands.

However, in the present state of the art of geospatial imagery, current methods for retrieving data are inadequate to meet many needs. A method of designating an area of interest, as captured from a database using graphic methods such as cursor manipulation over a representative map image displayed on, for example, a monitor of a computer, usually results in rectangular sections of the land parcel. In many cases, rectangular areas are not what is desired. Both natural boundaries, such as land/water interfaces and elevation variations, and artificial boundaries, such as property lines, boundaries of incorporated towns, counties, and states, separation of agricultural lands into irregular fields of different crops, and others, result in areas of interest which have irregular outer boundaries, or which otherwise differ from rectangular configurations. Therefore, it may be said that non-correspondence of the desired image with rectangular or other regular polygonal configurations presents a second problem to acquisition of imagery.

Still another problem arises from methods of initially acquiring imagery and placing corresponding data into a suitable database. Most subdivisions of land area images correspond to photographic frames. When a user designates a specific area of interest, under current conditions, he or she is constrained to accept those frames or partial frames which cover the area of interest. This leads to certain duplicated or wasteful conditions. One is that several adjacent frames may collectively cover the area of interest. A second wasteful condition is that a frame may cover a much greater area than that of the area of interest. This causes the user to receive imagery covering a considerably greater area than that desired. Consequently, a problem arises that the user will be obliged to ignore or remove unwanted coverage from images as those images have been captured in unmodified form.

A still further problem is that of merging of images from adjacent frames, particularly as this relates to aligning and matching borders. The state of the art has failed to accomplish "seamless" master or sector imaging to provide images of areas of interest which are free from unreasonable distortion due to merging of initial data acquisition images. An image of a desired area of interest is in current practiced, cobbled together from a plurality of images. This is called "mosaicing". The final product, called a "mosaiced image", is the result of objectionably tedious, painstaking effort.

In some prior art procedures, portions of images have been cropped or otherwise extracted, but have been placed into a rectangular data field and hence have been retained in the conventional image format.

Finally, a carefully crafted or "customized" mosaiced image is usually available on a data storage medium such as a compact disc, and is delivered by mail or courier service in a time period which may be measured in days. Data in such media is in a format created by the supplier of data, and may well not be immediately useful to the user.

Neither the above patent nor present practice in the field of geospatial imagery, taken either singly or in combination, is seen to describe the instant invention as claimed.

SUMMARY OF THE INVENTION

The present invention provides method and apparatus resulting in a geospatial imagery data service which answers selectively different data needs from a designated geographic coverage area, limits imagery data to fairly precise geographic bounds which may be irregular rather than rectangular, generates nearly seamless mosaiced images, and delivers final images almost instantaneously in digitized form over the internet to a widespread audience of potential users. No tedious manipulation is necessary to limit the delivered image to the area of interest, nor to create a single seamless image. Delivery of selected data can be nearly instantaneous if using a communications modality such as, for example, the internet. Alternative forms of data dissemination include generation and shipment of compact disc, and printing and shipment of hard paper copy.

To these ends, the novel method organizes many different varieties of geospatial imagery data taken of a wide geographic area into a common database. Illustratively, the database may cover the entire continental United States. A master data management program preloaded into the computer maintaining the database supports a plurality of available formats, such as GeoTIFF, jpg, TIFF, among many others. The user may select an area of interest of any geographic boundary configuration, designate desired layers of data within the selected boundary, select a desired format, and have a single nearly seamless mosaiced image of the selected area automatically generated and delivered in a selected medium. The media may include remotely communicated digitized data which is ultimately loaded into the user's computer or other data processing device for ultimate use, or may be a compact disc or other "hard" data storage form, or may be printed as a paper map.

Images in the present invention, which have irregular boundaries, are limited in the data required to reproduce the area of interest. This characteristic reduces the burden of storage and bandwidth in transmission of data corresponding to the images.

Accordingly, it is one object of the invention to provide modified geospatial imagery in digital form expeditiously to remote locations.

It is another object of the invention to provide imagery of areas bounded according to a user's precise requirements, rather than according to configuration of the original image.

An additional object of the invention is to enable a user to select a data format.

It is a further object of the invention to enable data transmission of imagery by file transfer protocol using wide ranging communications networks such as the internet.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawing.

BRIEF DESCRIPTION OF THE DRAWING

Various other objects, features, and attendant advantages of the present invention will become more fully appreciated as the same becomes better understood when considered in conjunction with the accompanying drawing which is a block diagram of steps of practicing the novel method.

DETAILED DESCRIPTION OF THE PREFERRED EMBODIMENTS

The present invention is a method of acquiring geospatial data and disseminating the geospatial data automatically and in a final useful form to users. The geospatial data is initially acquired through downward looking imagery acquisition methods, such as by satellite, aircraft, rocket, or balloon mounted cameras. A suitable sensor, such as a digital detector array, captures a succession of images of a selected earth surface area an image of which is to be stored in a database. Each corresponding image is a limited portion of the entire selected earth surface area. This occurs whenever the selected earth surface area, which of course will be understood to encompass bodies of water as well as solid land masses, is greater than the area which can be covered by the background field of one image as that image is initially captured. Normally, geospatial imagery is useful only when considering large land areas.

The images are digitized so that data corresponding to a geospatial image of each portion of the selected earth surface area can be entered into a data processing device such as a computer. Plural images are taken of each portion. Each image captures at least one characteristic of the selected earth surface area. Each characteristic corresponds to one property of the associated image, and will preferably correlate to different frequency bands of the spectrum of visible and invisible light. Of course, other forms of radiant energy may be captured as imagery, depending upon the need.

To practice the present invention, at least one image is required. In the preferred embodiment, a minimum of four images are desired. The first two images, which may be in raster or vector form, cover the same geographic area, but differ in or thematic content. Examples of thematic content include distinguishing a crop such as corn or wheat from another, determining stage of ripeness, identifying presence of infestation or aridity of the soil. Illustratively, considering the example relating to precision farming previously presented, one image would be an infrared image and the other image would be near infrared. Succeeding images cover portions of the geographic area not previously captured, again differing in frequency band. In the current example, the third image would be infrared and the fourth image would be near infrared. This process is repeated until the entire earth surface area under study is suitably captured as images. Therefore, the number of images providing raw data can be as few as four, while there is no upper limit.

The many images are digitized for data storage in a computer or the like. Each image provides a set of digital data which will be entered into the computer. In the current example, four sets of digital data are obtained. In practice, the number of images will be considerably greater. This is so in part because large land areas can be captured in satisfactory detail only by many images, and also because it may be desirable to obtain more than two frequency scans for each area sector. If desired, the steps of obtaining images and digitizing these images may be combined by utilizing a digital camera.

A suitable computer having memory capable of storing digitized data, a central processing unit is provided, and control elements such as a mouse, keypad, or other apparatus for generating and entering commands which operate the data processing device. The computer is loaded with software which enables a user to use manual cursor control methods to manipulate data stored in the data processing device.

Data manipulation arises from two sources. The first source is initial preparation of image derived data so that it is in readily usable format. To this end, the data from the first image and all subsequent images is integrated into a common database stored in the memory of the computer. The common database corresponds to a resultant final geospatial image covering every portion of the selected earth surface area. Prior to entering the database into memory, each sector is mosaiced such that boundaries and features of each portion of the entire earth surface area captured in geospatial images aligns with boundaries and features of every adjacent portion in aligned, continuous, nearly seamless manner. Mosaicing is a known procedure which will not be set forth in greater detail herein. This procedure is performed for each of the frequencies or other characteristics of each of the multispectral images which has been obtained. As a result, the final geospatial image reflects both every characteristic of the selected earth surface area and also reflects the entire geographic extent of the selected earth surface area.

The final geospatial image is stored in memory and is available for retrieval. Because the total amount of data is potentially quite great, the final geospatial image is divided into non-overlapping, complementing sectors. Each sector is stored as a separate file in a manner enabling the final geospatial image to be recreated on demand, retaining the seamless mosaiced configuration created when the final image was first established.

Unlike current geospatial databases, these parts do not coincide with the raw data images employed as inputs. Rather, each part comprises an arbitrarily defined cell or portion of the whole wherein the parts collectively exactly correspond to the whole selected earth surface area. Alternatively stated, there is neither overlap from one cell to an adjacent cell, nor is there any portion of the entire geospatial image which is omitted when adjacent cells are viewed together.

The software both enables storage of data in the manner described above and also enables a person to retrieve the final geospatial image in whole or in part and to designate a portion thereof for reproducing. Computer commands display the final image on a display device such as a computer monitor, designate a selected portion of the final image for reproduction, and effect reproduction of the designated portion of the final geospatial image.

While the above process can be performed on one computer provided with a monitor and control elements, it is strongly desired that the computer and its data and software stored therein be placed in operable communication with a communications network such as the internet. This signifies that the data be subject to standard file transfer protocol procedures.

Use of the available data constitutes the second source of data manipulation. The user transmits commands to the computer storing the software and data, retrieves the final geospatial image, and designates a portion thereof for reproduction. Designation of a portion is accomplished by cursor control, such as by employing a computer mouse to trace on the displayed final image that portion desired to be reproduced and, if need be, by generating additional commands recognizing the traced portion and initiating reproduction. This type of data manipulation by a computer user is known and need not be set forth in detail herein.

An attribute of the invention is that of selecting an irregular area for transmission, and being able to omit from transmission all portions of the mosaiced geospatial image excluded from the designated portion of the selected area of interest. This is accomplished by using ordinary software techniques for designating the area of interest. Illustratively, the final, mosaiced image is displayed on a screen of a monitor. A cursor, such as one controlled by a computer mouse, is moved along the screen in a path reproducing a desired or intended boundary of an area of interest. Depending upon the software loaded into the associated computer, the area within the intended boundary is demarcated by a control action such as clicking on the right mouse button, clicking on a predetermined icon appearing on the screen, striking the "enter" key or other predetermined key sequences pre-established in the software. The area of interest now being demarcated, it can be saved as a file or otherwise stored, or alternatively, transmitted immediately.

For the purposes of the present invention, the area being demarcated is preferably irregular or non-rectangular. That is, the outer boundary of the area of interested is of a configuration excluding basic geometric shapes such as squares, rectangles, circles, ellipses, triangles, pentagons, octagons, and others which display recurring defining features. Rather, the shape may include any one or a combination of complex curves, a great many unequal line segments, a large number of different internal angles, and other features which require careful intentional manipulation of the cursor.

The irregular outer boundary thus demarcated are usually not fanciful or arbitrary, but will usually correspond to plots of land dedicated to a specific purpose or under a unified scheme of management or control. Illustratively, the demarcated boundary may reflect political or legal subdivisions, a legal boundary of a plot of land as related to ownership, or may reflect divisions between sections of a plot of land, where the divisions are characterized by different categories of land usage of land of common ownership. Different land cover types may determine the boundaries regardless of ownership bounds. Still other logical boundaries may be demarcated.

Preferably, commands for retrieving the demarcated portion of the final mosaiced geospatial image and for reproducing the same are generated remotely from the computer, and are transmitted by a communications modality such as the internet. The communications modality is preferably of a type to transmit the data by standard file transfer protocol.

Other forms of reproduction are available. One option is to reproduce the designated portion of the final geospatial image by downloading data corresponding to the designated portion of the final geospatial image onto a data storage device such as a diskette or a compact disc. The precise nature of the storage device is not important so long as it is dimensioned and configured to be readily and manually insertable into and removable from a computer, and is operable to transfer data.

Still another form of reproduction is to provide a printer operably connected to the computer, and to print the designated portion of the final geospatial image onto paper, utilizing the printer. This is done remotely by computer commands.

The invention may be practiced as steps of a method of acquiring and disseminating geospatial data automatically and in a final useful form. The following steps are practiced, and are summarized in the drawing. First step 10 comprises acquiring first digital data corresponding to a geospatial image of a first portion of a selected earth surface area, which first portion is less than the entire selected earth surface area, and wherein the first digital data captures at least a first characteristic of the selected earth surface area. Second step 12 comprises acquiring second digital data corresponding to a geospatial image of the first portion of the selected earth surface area, wherein the second digital data captures at least a second characteristic of the selected earth surface area, which second characteristic is different from the first characteristic.

Third step 14 comprises acquiring third digital data corresponding to a geospatial image of a second portion of the selected earth surface area, which second portion is different from the first portion of the selected earth surface area and which second portion is less than the entire selected earth surface area, and wherein the third digital data captures at least the first characteristic of the selected earth surface area. Next step 16 comprises acquiring fourth digital data corresponding to a geospatial image of the selected earth surface area, wherein the fourth digital data geospatial image corresponds to the second portion of the selected earth surface area, and the fourth digital data captures at least the second characteristic of the selected earth surface area.

Following is step 18 which comprises providing a data processing device capable of processing digitized data, having a memory device capable of storing digitized data, and having control elements disposed to generate commands which operate the data processing device. Next comes a step 20 of integrating the first digital data, the second digital data, the third digital data, and the fourth digital data into a common database and storing the common database within the data processing device, wherein the common database contains data corresponding to a resultant final geospatial image covering the first portion and the second portion of the selected earth surface area such that boundaries and features of the first portion align with boundaries and features of the second portion in aligned, continuous, nearly seamless manner, and the final geospatial image reflects both the first characteristic of the selected earth surface area and the second characteristic of the selected earth surface area. A preferred data storage procedure modifies step 20 to include the step 22 of dividing the final geospatial image into non-overlapping, complementing sectors, and storing each sector as a separate file.

Next is step 24 of providing and installing within the data processing device software which enables a user to use manual cursor control methods to manipulate data stored in the data processing device to display the final geospatial image on a display device, designate a portion of the final geospatial image for reproduction, and reproduce the designated portion of the final geospatial image. Next is step 26 of placing the data processing device and data and software stored therein in operable communication with the internet.

When the system is used, a further step 28 comes into play. Step 28 includes reproducing the designated portion of the final geospatial image responsive to computer commands generated remotely and transmitted by the internet. Step 28 preferably includes a further step of demarcating the designated portion of the mosaiced geospatial image as having an irregular peripheral boundary contained within the entirety of the mosaiced geospatial image.

As has been mentioned, several options in reproducing a desired section of the final geospatial image are possible. These options are put into practice by a step 30 of transmitting data by file transfer protocol over the internet. Step 30 preferably includes the further step of omitting all portions of the mosaiced geospatial image excluded from the designated portion from the transmission. The further step will yield a processed image which is limited to the area of interest, which avoids distractions and confusion by omitting irrelevant portions of the full mosaiced image, permits ready recognition of the designated portion and internal sections and features thereof, and reduces data storage requirements.

As an alternative to immediate connection to a communications network such as the internet, a user may select a step 32 of downloading data corresponding to the designated portion of the final geospatial image onto a data storage device dimensioned and configured to be readily and manually insertable into and removable from a computer. In a further option, the user may practice a step 34 of providing a printer operably connected to the computer, and printing the designated portion of the final geospatial image onto paper, utilizing the printer. Steps 30, 32, and 34 are not mutually exclusive. Any one or any combination of these steps may be selected by a user of the method.

It will be recognized that other wide ranging communications channels or networks may be utilized in place of the internet. Communications channels may be hard wired or wireless, and will be understood to encompass all electromagnetic energy forms. While the internet is one of the best known and most widely available such channels, it is merely necessary that the selected channel enable uploading and downloading of digital data, and transmitting data over great distances.

While it is preferred to capture images immediately in digital form, such as by a digital detector array carried aboard the image acquisition platform, it would be possible to utilize photography, with suitable conversion to digital format being performed subsequently.

It is to be understood that the present invention is not limited to the embodiments described above, but encompasses any and all embodiments within the scope of the following claims.

We claim:

1. A method of acquiring geospatial data and disseminating the geospatial data automatically, comprising the steps of:

acquiring digital data corresponding to a geospatial image of a first portion of a selected earth surface area, and wherein the digital data captures at least a first physical characteristic of the selected earth surface area;

providing a data processing device capable of processing digitized data, having a memory device capable of storing digitized data, and having control elements disposed to generate commands which operate the data processing device;

providing and installing within the data processing device software which enables a user to use manual control methods to manipulate data stored in the data processing device to designate a portion of the geospatial image for reproduction, and reproduce the designated portion of the geospatial image;

demarcating a further designated portion within the designated portion of the geospatial image as having an irregular peripheral boundary contained within the entirety of the geospatial image;

placing the data processing device and data and software stored therein in operable communication with a communications network;

transmitting over the communications network the further designated portion of the geospatial image; and omitting from the transmission all portions of the geospatial image not within the irregular peripheral boundaries of the further designated portion.

2. A method of acquiring geospatial data and disseminating the geospatial data automatically and in a useful form, comprising the steps of:

acquiring first digital data corresponding to a geospatial image of a first portion of a selected earth surface area, which first portion is less than the entire selected earth surface area, and wherein the first digital data captures at least a first characteristic of the selected earth surface area;

acquiring second digital data corresponding to a geospatial image of the first portion of the selected earth surface area, wherein the second digital data captures at least a second characteristic of the selected earth surface area, which second characteristic is different from the first characteristic;

acquiring third digital data corresponding to a geospatial image of a second portion of the selected earth surface area, which second portion is different from the first portion of the selected earth surface area and which second portion is less than the entire selected earth surface area, and wherein the third digital data captures at least the first characteristic of the selected earth surface area;

acquiring fourth digital data corresponding to a geospatial image of the selected earth surface area, wherein the fourth digital data geospatial image corresponds to the second portion of the selected earth surface area, and the fourth digital data captures at least the second characteristic of the selected earth surface area;

providing a data processing device capable of processing digitized data, having a memory device capable of storing digitized data, and having control elements disposed to generate commands which operate the data processing device;

integrating the first digital data, the second digital data, the third digital data, and the fourth digital data into a common database and storing the common database within the data processing device, wherein the common database contains data corresponding to a resultant mosaiced geospatial image covering the first portion and the second portion of the selected earth surface area such that boundaries and features of the first portion align with boundaries and features of the second portion in aligned, continuous, nearly seamless manner, and the mosaiced geospatial image reflects both the first characteristic of the selected earth surface area and the second characteristic of the selected earth surface area;

providing and installing within the data processing device software which enables a user to use manual cursor control methods to manipulate data stored in the data processing device to designate a portion of the mosaiced geospatial image for reproduction, and reproduce the designated portion of the mosaiced geospatial image;

demarcating the designated portion of the mosaiced geospatial image as having an irregular peripheral boundary contained within the entirety of the mosaiced geospatial image;

placing the data processing device and data and software stored therein in operable communication with a wide ranging communications network;

transmitting over the communications network the designated portion of the mosaiced geospatial image; and omitting all portions of the mosaiced geospatial image excluded from the designated portion from the transmission.

3. The method according to claim 2, wherein said step of integrating the first digital data, the second digital data, the third digital data, and the fourth digital data into a common database and storing the common database within the data processing device comprises the further steps of dividing the mosaiced geospatial image into non-overlapping, complementing sectors, and storing each sector as a separate file.

4. The method according to claim 2, comprising the further step of reproducing the designated portion of the mosaiced geospatial image responsive to computer commands generated remotely and transmitted by the communications network.

5. The method according to claim 4, wherein said step of reproducing the designated portion of the mosaiced geospatial image comprises a further step of transmitting data by file transfer protocol over the communications network.

6. The method according to claim 4, wherein said step of reproducing the designated portion of the mosaiced geospatial image comprises a further step of downloading data corresponding to the designated portion of the mosaiced geospatial image onto a data storage device dimensioned and configured to be readily and manually insertable into and removable from a computer.

7. The method according to claim 4, wherein said step of reproducing the designated portion of the mosaiced geospatial image comprises the further steps of providing a printer operably connected to the computer; and printing the designated portion of the mosaiced geospatial image onto paper, utilizing the printer.

8. A method of acquiring geospatial data and disseminating the geospatial data automatically, comprising the steps of:

acquiring first digital data corresponding to a geospatial image of a first portion of a selected earth surface area, which first portion is less than the entire selected earth surface area, and wherein the first digital data captures at least a first physical characteristic of the selected earth surface area;

acquiring second digital data corresponding to a geospatial image of the first portion of the selected earth surface area, wherein the second digital data captures at least a second physical characteristic of the selected earth surface area, which second physical characteristic is different from the first physical characteristic;

acquiring third digital data corresponding to a geospatial image of a second portion of the selected earth surface area, which second portion is different from the first portion of the selected earth surface area and which second portion is less than the entire selected earth surface area, and wherein the third digital data captures at least the first physical characteristic of the selected earth surface area;

acquiring fourth digital data corresponding to a geospatial image of the selected earth surface area, wherein the fourth digital data geospatial image corresponds to the second portion of the selected earth surface area, and the fourth digital data captures at least the second physical characteristic of the selected earth surface area;

providing a data processing device capable of processing digitized data, having a memory device capable of storing digitized data, and having control elements disposed to generate commands which control the data processing device;

integrating the first digital data, the second digital data, the third digital data, and the fourth digital data into a common database and storing the common database within the data processing device, wherein the common database contains data corresponding to a resultant mosaiced geospatial image covering the first portion and the second portion of the selected earth surface area such that
- boundaries and features of the first portion align with boundaries and features of the second portion in aligned, continuous, nearly seamless manner, and
- the mosaiced geospatial image reflects both the first physical characteristic of the selected earth surface area and the second characteristic of the selected earth surface area;

dividing the mosaiced geospatial image into non-overlapping, complementing sectors, and storing each sector as a separate file;

providing and installing within the data processing device software which enables a user to use cursor control methods to manipulate data stored in the data processing device to
- display the mosaiced geospatial image on a display device,
- designate a portion of the mosaiced geospatial image for reproduction, and
- reproduce the designated portion of the mosaiced geospatial image;

placing the data processing device and data and software stored therein in operable communication with the communications network;

demarcating the designated portion of the mosaiced geospatial image as having an irregular peripheral boundary contained within the entirety of the mosaiced geospatial image;

transmitting data corresponding to the designated portion of the mosaiced geospatial image by file transfer protocol over the communications network; and omitting all portions of the mosaiced geospatial image not the designated portion from transmitted data, responsive to computer commands generated remotely and transmitted by the communications network.

* * * * *